Oct. 3, 1961 C. STENNES 3,002,281
GEOMETRICAL CUTTING MACHINE
Filed Aug. 14, 1959 4 Sheets-Sheet 1
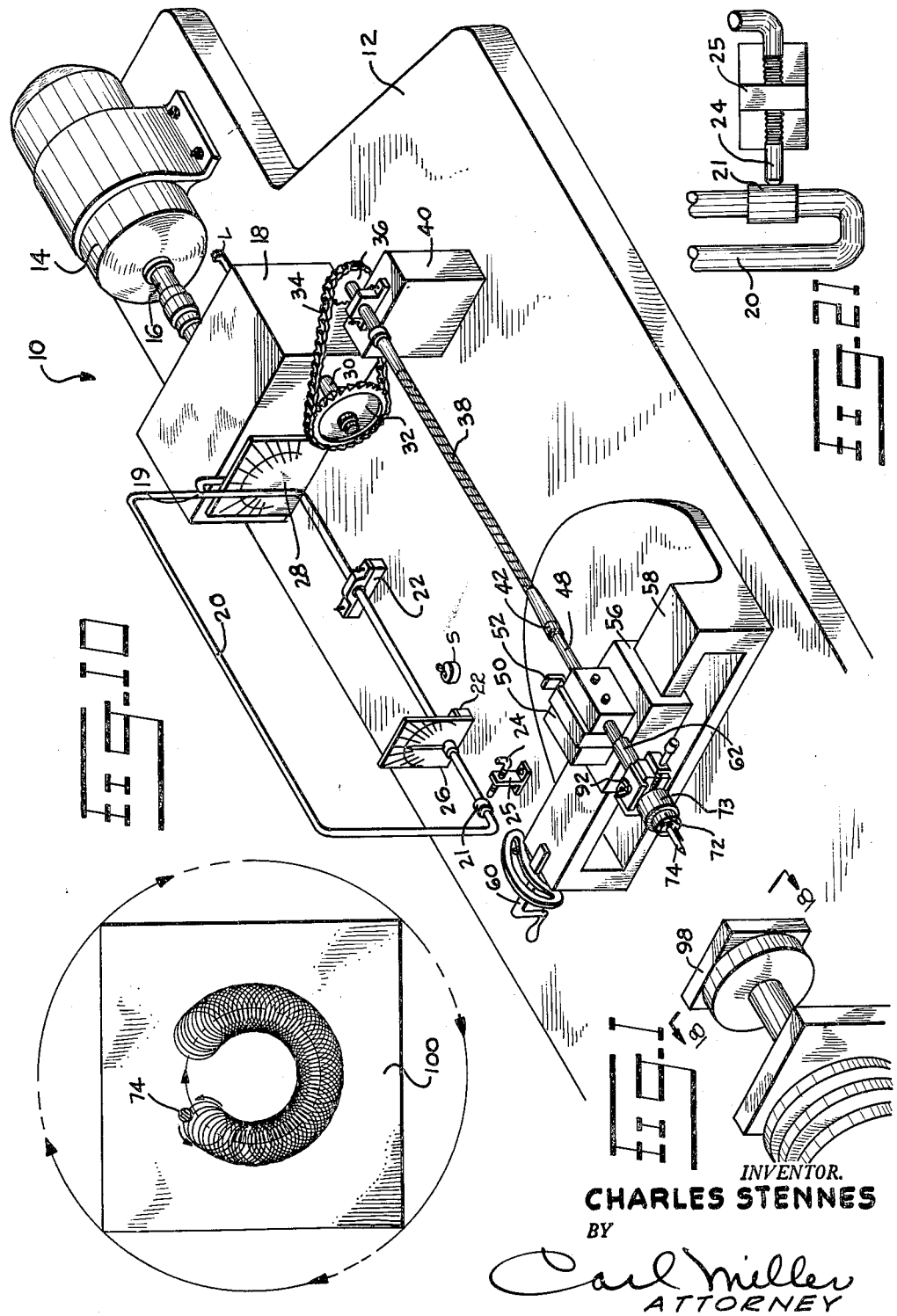
INVENTOR.
CHARLES STENNES
BY
Carl Miller
ATTORNEY Oct. 3, 1961     C. STENNES     3,002,281
GEOMETRICAL CUTTING MACHINE
Filed Aug. 14, 1959     4 Sheets-Sheet 2
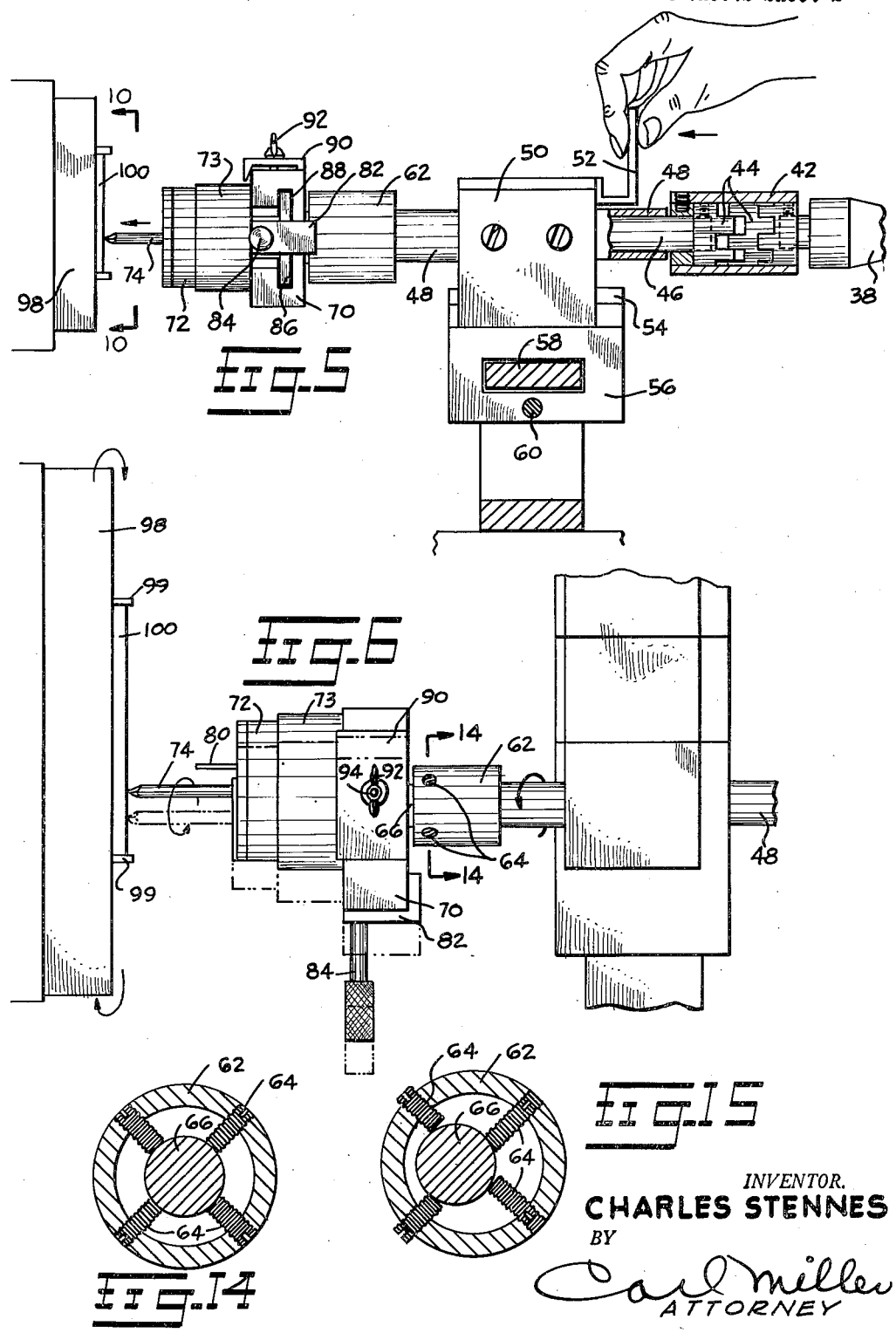
INVENTOR.
CHARLES STENNES
BY
Carl Miller
ATTORNEY

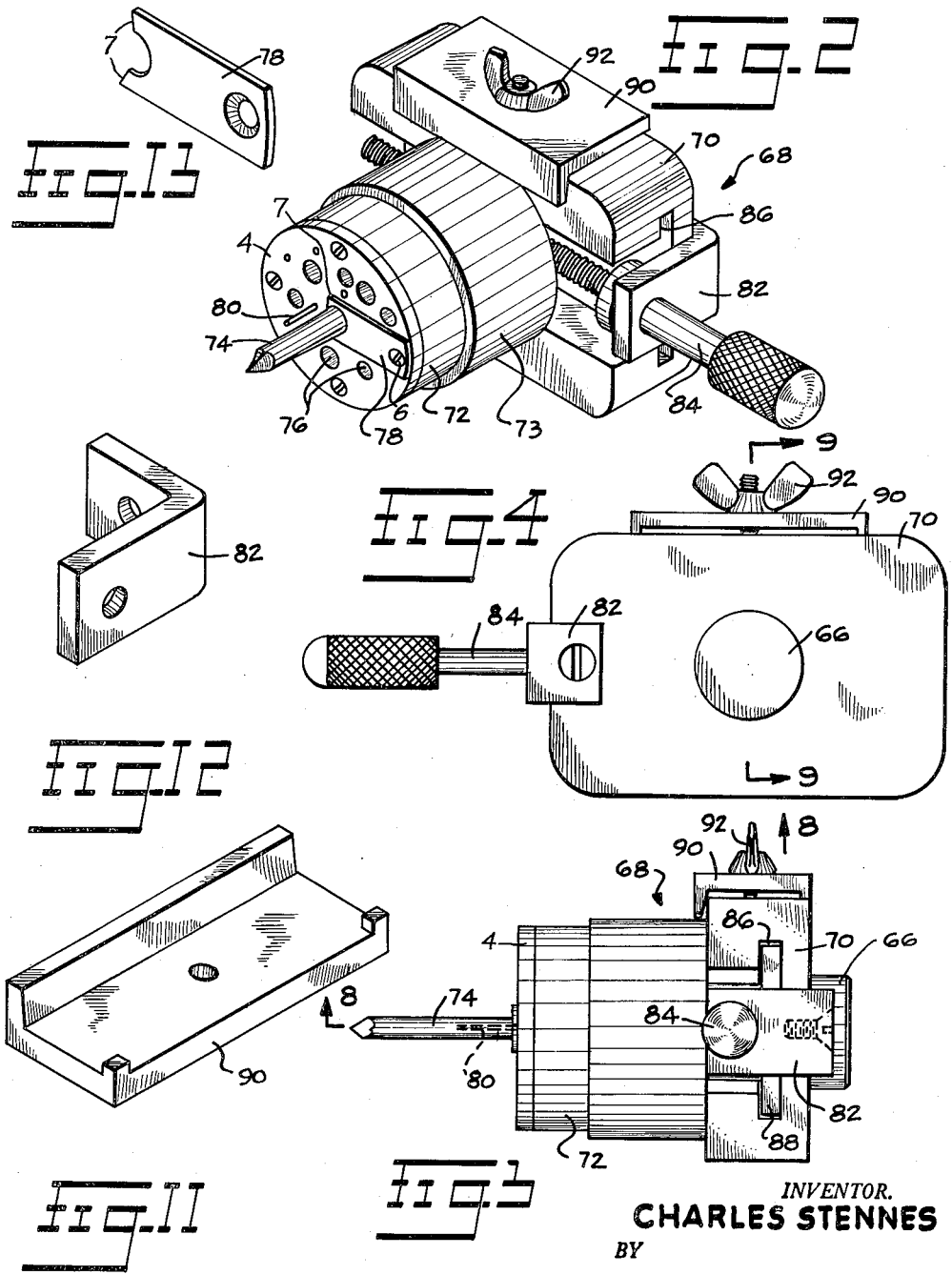

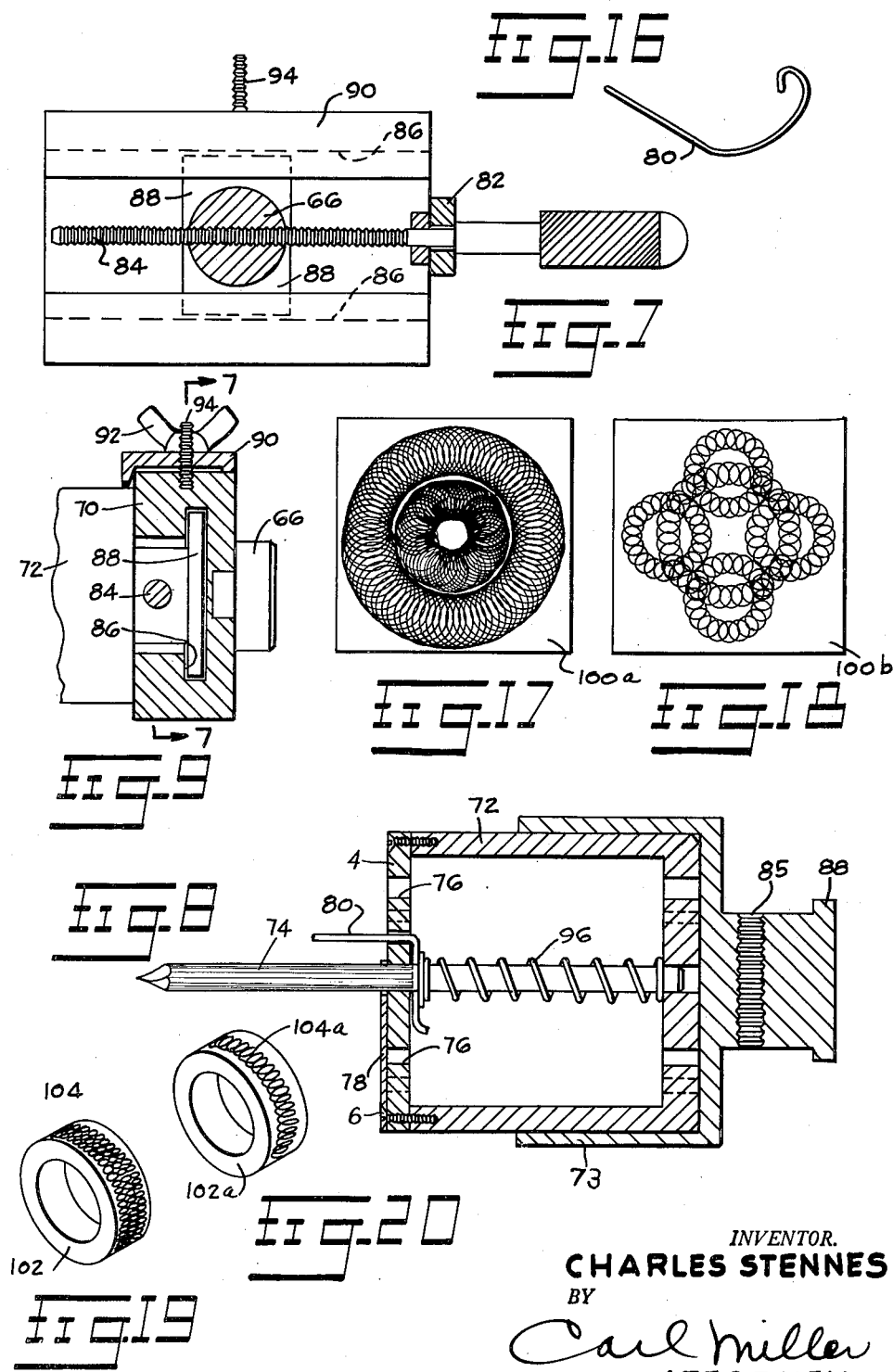

United States Patent Office 3,002,281
Patented Oct. 3, 1961

3,002,281
GEOMETRICAL CUTTING MACHINE
Charles Stennes, Ridgewood, N.Y.
(80–82 Bowery, Room 504, New York 2, N.Y.)
Filed Aug. 14, 1959, Ser. No. 833,755
8 Claims. (Cl. 33—27)

This invention relates to machine tools and, more particularly, to a cutting machine.

It is sometimes necessary to inscribe a geometrical design within a work piece, such as scroll work in metal plates. It is therefore an object of the present invention to provide a cutting machine which can be selectively adjusted to provide various symmetrical designs in the surface of an article in a simple and efficient manner, and with a high degree of accuracy.

Another object of the present invention is to provide a geometrical cutting machine that can be used with a machine lathe, and which can be placed in any desired position for engraving articles of various sizes and shapes.

Still another object of the present invention is to provide a cutting machine of the type described that can be accurately adjusted, may be operated at any desired speed, and which produces extremely accurate and precision work.

Still an additional object of the present invention is to provide a cutting machine of the type described that can be manufactured at a relatively low cost and used on conventional machine lathe equipment.

All of the foregoing and still further objects and advantages of this invention will become apparent from a study of the following specification, taken in connection with the accompanying drawing, wherein:

FIGURE 1 is a perspective view of a machine made in accordance with the present invention;

FIGURE 2 is a front perspective view of a tool holder forming a part of the present invention;

FIGURE 3 is a side elevational view of the assembly shown in FIGURE 2;

FIGURE 4 is a bottom plan view of the device shown in FIGURE 2;

FIGURE 5 is a partial side elevational view of certain parts of the assembly shown in FIGURE 1, showing the cutting tool in a forward operating position;

FIGURE 6 is a top plan view of the device shown in FIGURE 5, illustrating the tool revolving eccentrically about the drive mechanism;

FIGURE 7 is a transverse cross sectional view of a screw device for adjusting the position of the cutting tool with respect to the center of the assembly;

FIGURE 8 is a longitudinal cross sectional view taken along line 8—8 of FIGURE 3;

FIGURE 9 is a cross sectional view taken along line 9—9 of FIGURE 4;

FIGURE 10 is a front elevational view of the assembly shown in FIGURE 5, showing the relative movements of the tool and lathe head holding the product being worked upon;

FIGURE 11 is a bottom perspective view of a clamping element;

FIGURE 12 is a perspective view of an angle clamp forming another part of the present invention;

FIGURE 13 is a perspective view of a tool adjusting plate forming still another part of the present invention;

FIGURE 14 is a transverse cross sectional view taken along line 14—14 of FIGURE 6;

FIGURE 15 is a view similar to FIGURE 14, showing the clamping device in an eccentric arrangement;

FIGURE 16 is a perspective view of a retaining pin forming another part of the present invention;

FIGURE 17 is a top plan view of a plate having a design made with the tool of the present invention scribed upon the surface thereof;

FIGURE 18 is a slightly modified form of design;

FIGURE 19 is a perspective view of a cylindrical element having a design inscribed thereupon;

FIGURE 20 is a view similar to FIGURE 19, showing a slightly modified form of design; and FIGURE 21 is an enlarged fragmentary plan view of certain clamping parts of the present invention.

Referring now to the drawing, a cutting machine 10 made in accordance with the present invention includes a base plate 12 having an on and off switch S for motor control 14 mounted on said base plate, the motor having a drive shaft 16 extending outwardly into driving engagement with the gearing of a speed reduction unit 18. This unit has a control lever L for clockwise and counterclockwise operation. An open frame 20 pivotally supported upon a bearing unit 22 of the base plate 12 has an arm 19 connected to the speed adjustment parts of the gear box 18 so as to adjust the speed ratio between the input shaft 16 and the output shaft 30, whenever desired. A threaded shaft 24 carried upon the mounting bracket 25 is selectively movable into securing engagement with a friction ring 21 of the frame 20 to selectively secure the frame 20 in any desired adjusted position to maintain the selected setting of the gear ratio. The speed may be determined by indicator plates 26, 28 for accurate and precision work.

A sprocket wheel 32 secured upon the output shaft 30 of the gear box 18 is in driving engagement with the sprocket chain 34 that also engages with a sprocket wheel 36 secured to one end of a flexible shaft 38 that is mounted upon a block 40. A coupling member 42 encloses intermeshing drive elements 44 secured to the flexible shaft 38 and an extension shaft 46. A sleeve 48 encircles the extension shaft 46 to be driven thereby and is rotatably mounted in a bearing block 50 which is slidably supported upon a set of guides 54 carried by a slide block 56. The slide block 56 slidably supported upon the transversely extending plate 58 stationary with the base 12, and may be adjusted in a direction transversely of the base by means of a threaded shaft 60. Because of the sliding action of the sleeve 48 upon the shaft 46, the bearing block 50 may be moved longitudinally to engage and disengage the cutting tool 74 with the work piece 100.

An enlarged sleeve 62 integral with the slide sleeve 48 is provided with a plurality of radially inwardly extending set screws 64 which adjustably mount the mounting stud 66 of a tool holder 68. Thus, by adjusting the set screws 64, as shown in FIGURES 14 and 15, the eccentricity of the tool holder with respect to the driving shaft elements may be adjusted.

Referring now more in detail to FIGURES 2 and 3 of the drawing, the tool holder 68 is shown to include a main block 70, a forwardly extending cup 73 and an enclosed cylindrical portion 72. The cutting tool 74 is removably placed within any one of the mounting holes 76 of the face plate of the tool holder and maintained in position by means of a tool adjusting plate 78 and retaining pin 80. The inside end of the retaining pin 80 is bent at right angles into parallelism with the surface of apertured tool holder plate 4 forming the end of cylinder 72 and extending transversely through the mid section of the tool 74 and against which one end of a compression spring 96 acts, the opposite end of which spring is seated upon the inside of said cylinder 72 as noted in FIG. 8. Thus, as will be hereinafter more fully described, the compression spring 96 exerts a yielding outward pressure against the cutting tool 74 so as to maintain a predetermined pressure upon the cutting tool for cutting to a desired depth. Upon plate 4 is secured a friction plate 78 by screw 6 with its bifurcated end 7 (FIGURES 2 and 13) virtually straddling tool 74 exteriorly of plate 4 to exert limited regulating friction on this tool.

An angle bracket 82 is secured to the block 70 of the tool holder and rotatably supports a threaded shaft 84 which is threadedly received within an internally threaded bore 85 in the base of the cup 73. This base is provided with tongues 88 that are slidably received within a transversely extending T-slot 86 in the block 70 so as to enable the shaft 84 to adjust the lateral position of the tool 74 with respect to the block 70. Once adjusted, the parts are secured in the desired position by means of a clamp plate 90 upon a mounting stud 94 and movable into securing engagement with the adjacent surface of the cup 73 by means of a wing nut 92.

The face plate 98 of the lathe is provided with stops 99 for positioning the work piece 100 with respect to the tool holder. In actual use, a work piece 100 of any desired material is mounted upon the selected portion of the face plate 98 and the face plate rotated at a slow selected speed, in the direction of the arrow. Simultaneously with the rotation of the face plate of the lathe, the drive mechanism of the cutting tool is actuated to effect rotation of the tool holder 68 with the cutting tool 74 mounted in the desired position with respect thereto. By moving the push plate 52 of the bearing block 50 forwardly, the cutting tool 74 may be brought into bearing and cutting engagement with the surface of the work piece 100, the pressure against the cutting tool 74 being limited by the rate of the compression spring 96 within the cylinder 72. The drive shaft assembly of the cutting tool is rotated by the speed reduction unit in the direction of the arrows shown in FIGURE 10, simultaneously with the rotation of the work piece 100, also in the direction of the arrows shown. The relative movement between the work piece and the cutting tool is employed to produce a symmetrical design, such as that shown in FIGURE 10, as well as the other variations shown on the work pieces in FIGURES 17 and 18, 100a, 100b. All that is necessary to change or adjust the design is to move the cutting tool from one socket 76 to another, adjust the lateral position of the cup 73 with respect to the block 70, and to adjust the position of the slide 56 with respect to the transverse bar 58. Any one of these adjustment operations will affect the relative position of the cutting tool with respect to the work piece, thus changing the design being engraved. A flexible shaft 38 enables the tool holder to be brought into operation at any desired point, and is sufficiently flexible to permit substantial lateral adjustment without affecting the drive connections between the sprocket wheels and the speed reducer gear. Three dimensional objects may also be engraved, such as those 102, 102a shown in FIGURES 19 and 20, in which the design 104, 104a may be engraved around the periphery thereof.

During use, the most efficient operating speeds are selected for the face plate of the lathe and for the rotation of the cutting tool. The fine adjustments possible thus enable all types of accuracy and precision requirements to be met.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. A geometrical cutting machine comprising, in combination, a tool holder having a main block upon the machine adjustably supporting a cutting tool, a drive shaft, motor drive means for rotating said drive shaft, a work piece mount supported for rotation about an axis substantially parallel to the axis of rotation of said drive shaft and the axis of rotation of said cutting tool, said tool holder comprising an apertured tool holder plate slidably receiving cutting tools selectively therewith, a mounting stud fixed to said main block and projecting therefrom, screw thread adjustment means engaging the mounting stud for positioning said cutting tool radially with respect to the longitudinal axis of rotation of said drive shaft, said apertured tool holder plate having a cup slidably supported upon said main block, a transversely extending threaded shaft rotatably supported upon said main block in threaded engagement with said cup of said apertured tool holder plate for effecting movement of said apertured tool holder plate transversely of said main block in response to rotation of said threaded shaft, said tool holder having a sleeve secured thereto and slidably receiving a portion of said drive shaft therewithin, clutch means drivingly connected in said drive shaft, said screw thread adjustment means being mounted in said sleeve, bearing block means rotatably mounting said sleeve, said bearing block means being shiftable transversely of the axis of rotation of said sleeve to provide for eccentric rotation of said tool holder with respect to said drive shaft, a push plate connected to said bearing block means for effecting longitudinal movement of a cutting tool with respect to a work piece for selectively engaging and disengaging said cutting tool relative to the surface being engaged.

2. A geometrical cutting machine as set forth in claim 1, further comprising a compression spring acting between said cup and said cutting tool yieldably resisting inward movement of said cutting tool toward said tool holder and away from said work piece, to impart a constant force upon said cutting tool for cutting the work piece to a desired depth.

3. A geometrical cutting machine as set forth in claim 2, wherein said motor drive means comprises an electric motor, and a speed reducing unit operably connected between said motor and said drive shaft.

4. A geometrical cutting machine as set forth in claim 3, wherein said drive shaft includes a flexible shaft portion operably connected intermediate said speed reducer and said tool holder.

5. A geometrical cutting machine as set forth in claim 4, further comprising a clamp plate carried by said tool holder releasably securing the cup of said apertured tool holder plate in an adjusted position relative thereto.

6. A geometrical cutting machine as set forth in claim 5, wherein said input speed reducer includes an input shaft connected to said motor, an output shaft, a sprocket wheel secured to said output shaft of said speed reducer, a sprocket secured to said flexible drive shaft portion, and a sprocket chain drivingly connecting said sprocket wheel of said speed reducer output shaft and said sprocket wheel of said flexible drive shaft portion together.

7. A geometrical cutting machine as set forth in claim 6, further comprising a base plate for the machine and a frame hingedly supported upon said base plate connected to the speed reducing device for adjusting the speed ratio of the latter, and screw threaded securing means carried by said base plate releasably securing said frame in an adjusted position to maintain the speed of rotation of said cutting tool substantially constant.

8. A geometrical cutting machine as set forth in claim 7, in which said apertured tool holder plate includes means for utilizing a plurality of tools up to two in number, at one and the same time, and which may be operated clockwise or counter-clockwise, which permits many variations of different designs.

References Cited in the file of this patent

UNITED STATES PATENTS

| | | |
|---|---|---|
| 1,269,920 | Foster | June 18, 1918 |
| 1,718,089 | Tesoroni | June 18, 1929 |
| 2,411,182 | Anderson | Nov. 19, 1946 |
| 2,733,073 | Phillips | Jan. 31, 1956 |

FOREIGN PATENTS

| | | |
|---|---|---|
| 20,336 | Great Britain | 1901 |
| 97,703 | Sweden | Dec. 27, 1939 |